US010024509B2

(12) United States Patent
Tsao et al.

(10) Patent No.: US 10,024,509 B2
(45) Date of Patent: Jul. 17, 2018

(54) EXTERIOR SIGNALING AND/OR ILLUMINATING LIGHT AND CORRESPONDING SIGNALING AND/OR ILLUMINATING SYSTEM

(71) Applicant: Zodiac Aero Electric, Montreuil (FR)

(72) Inventors: Christian Tsao, Rosny sous Bois (FR); Maxime De Truchis, Paris (FR)

(73) Assignee: ZODIAC AERO ELECTRIC, Montreuil (FR)

( * ) Notice: Subject to any disclaimer, the term of this patent is extended or adjusted under 35 U.S.C. 154(b) by 117 days.

(21) Appl. No.: 14/844,854

(22) Filed: Sep. 3, 2015

(65) Prior Publication Data

US 2016/0069529 A1 Mar. 10, 2016

(30) Foreign Application Priority Data

Sep. 3, 2014 (FR) .................................... 14 58220

(51) Int. Cl.

| | |
|---|---|
| ***F21S 43/20*** | (2018.01) |
| ***F21V 5/02*** | (2006.01) |
| ***B64D 47/04*** | (2006.01) |
| *F21Y 105/10* | (2016.01) |

(Continued)

(52) U.S. Cl.

CPC .............. *F21S 43/26* (2018.01); *B64D 47/04* (2013.01); *F21V 5/02* (2013.01); *B64D 2203/00* (2013.01); *F21W 2107/30* (2018.01); *F21Y 2105/10* (2016.08); *F21Y 2115/10* (2016.08)

(58) Field of Classification Search

CPC .. F21V 5/02; F21V 5/008; F21V 5/007; F21S 48/2212; F21S 43/20; B64D 47/04; B64D 47/06

See application file for complete search history.

(56) References Cited

U.S. PATENT DOCUMENTS

| | | | | |
|---|---|---|---|---|
| 4,542,448 A * | 9/1985 | Yamai ................ | F21S 48/1233 362/268 |
| 4,577,260 A * | 3/1986 | Tysoe ................. | F21S 48/2212 362/268 |

(Continued)

FOREIGN PATENT DOCUMENTS

| | | |
|---|---|---|
| DE | 102 05 779 A1 | 10/2003 |
| EP | 0 935 145 A1 | 8/1999 |
| FR | 1 528 022 A | 6/1968 |

OTHER PUBLICATIONS

French Preliminary Search Report completed on May 6, 2015, issued in corresponding French Application No. 0140058220, filed Sep. 9, 2014, 7 pages.

*Primary Examiner* — Jong-Suk (James) Lee
*Assistant Examiner* — Christopher E Dunay
(74) *Attorney, Agent, or Firm* — Christensen O'Connor Johnson Kindness PLLC

(57) ABSTRACT

This exterior signaling and/or illuminating light, especially for an aircraft, comprises an array of exterior illuminating optical modules (7) ensuring the execution of at least one exterior signaling and/or illuminating function and an array of at least one deviating optical device (14), the illuminating optical modules being selectively activatable in groups of at least one illuminating optical module in order to selectively execute an exterior signaling and/or illuminating function conjointly with said deviating optical device.

10 Claims, 2 Drawing Sheets

(51) Int. Cl.
*F21Y 115/10* (2016.01)
*F21W 107/30* (2018.01)

(56) References Cited

U.S. PATENT DOCUMENTS

| | | | | | |
|---|---|---|---|---|---|
| 4,652,979 | A * | 3/1987 | Arima | F21S 48/2212 | 362/268 |
| 4,654,761 | A * | 3/1987 | Walsh | F21S 48/2212 | 362/308 |
| 5,040,103 | A * | 8/1991 | Lyons | F21S 48/2212 | 362/268 |
| 5,636,056 | A * | 6/1997 | Itonaga | F21S 48/2212 | 359/601 |
| 6,264,347 | B1 * | 7/2001 | Godbillon | F21S 48/2212 | 362/328 |
| 6,352,359 | B1 * | 3/2002 | Shie | F21S 48/1233 | 362/331 |
| 7,686,481 | B1 * | 3/2010 | Condon | F21S 48/215 | 362/331 |
| 2010/0109531 | A1 | 5/2010 | Helms et al. | | |
| 2011/0169410 | A1 | 7/2011 | Dassanayake et al. | | |
| 2012/0313547 | A1 * | 12/2012 | Barnett | F21V 31/00 | 315/297 |
| 2015/0260365 | A1 * | 9/2015 | Kitayama | F21S 48/1208 | 362/519 |
| 2016/0153622 | A1 * | 6/2016 | Yu | H05B 33/0803 | 362/231 |
| 2016/0363288 | A1 * | 12/2016 | McKendry | F21V 5/045 | |

* cited by examiner

EXTERIOR SIGNALING AND/OR ILLUMINATING LIGHT AND CORRESPONDING SIGNALING AND/OR ILLUMINATING SYSTEM

SUMMARY

The invention generally relates to exterior signaling and/or illuminating lights. It also relates to a signaling and/or illuminating system equipped with such illuminating lights.

One particularly advantageous application for the invention relates to exterior illuminating lights for aircraft.

The expression "exterior signaling and/or illuminating" is thus especially understood to mean that the light is intended to illuminate a runway or taxiway during various phases of flight or taxiing of an aircraft.

In one particular embodiment, the invention relates to an exterior signaling and/or illuminating light for an aircraft, for example using light-emitting diodes (or LEDs) as sources of illumination.

As is known, an aircraft conventionally comprises an exterior illuminating system comprising a plurality of lights, each of which is able to carry out one or more illuminating functions. These illuminating lights are activated depending on the phase of flight or taxiing of the aircraft.

Thus, an aircraft especially comprises landing lights, which are generally positioned on the root of the wings and which are intended to illuminate the runway when the airplane is in flight and in the final approach phase.

On commercial airplanes, take-off lights, the optical properties of which are similar to those of landing lights, are in addition provided on the front landing-gear leg of the airplane. These lights are intended to illuminate the runway when the airplane is moving at high speeds on the ground, during phases of acceleration on takeoff or deceleration on landing.

The light flux delivered by the landing and take-off lights is characterized by beams, the photometric data of which are identical. Specifically, the light beams delivered by the landing and take-off lights have identical shapes and, in particular, an identical spatial light intensity distribution. It is a question of circular or oblong beams at 10% of the peak intensity. This spatial intensity distribution is spread over an angle of about 13° along the horizontal axis and of about 8° along the vertical axis.

However, the pointing angles of the light beams are different. Specifically, landing lights point along the rectilinear slope of descent of the airplane. During this phase, the zone to be illuminated corresponds to the location on the runway where the airplane must touch the ground. Specifically it is toward this location that the pilot must direct his gaze.

In contrast, during acceleration on take-off or during deceleration on landing, in particular after the front landing gear has made contact with the ground, the take-off lights illuminate the ground as far as possible in front of the airplane, their pointing angle being substantially parallel to the ground. The zone to be illuminated corresponds to the end of the runway.

Moreover, during taxiing of the airplane on a taxiway, in order to leave or access a runway, the beam must be wider than the beam required during takeoff or landing and point downwards.

Aircraft and, in particular, commercial airplanes, are thus equipped with an array of lights each dedicated to one illuminating function.

These pieces of equipment generally consist of separate optical units, thereby contributing to increasing the total weight of the illuminating system fitted on-board an aircraft. However, as is known, in the field of aeronautics, weight is a critical parameter.

Moreover, the electrical power consumption, the bulk and the number of locations required to ensure a satisfactory illumination with respect to the required performance create an additional constraint that must be taken into account with regard to installation of the on-board electrical network and with regard to supply of electrical power to the lights.

The aim of the invention is therefore to mitigate the drawbacks associated with using exterior signaling and/or illuminating lights according to the prior art and, especially, to provide a hybrid light capable of providing one or more illuminating functions.

It may in particular be a question, for example, of providing an exterior signaling and/or illuminating light capable of being selectively configured to operate either as a landing light or as a taxi light on a taxiway.

The subject of the invention is therefore, according to a first aspect, a signaling and/or illuminating light, especially for an aircraft, comprising an array of exterior illuminating optical modules ensuring the execution of at least one exterior signaling and/or illuminating function and an array of at least one deviating optical device, the illuminating optical modules being selectively activatable in groups of at least one illuminating optical module in order to selectively execute a signaling and/or illuminating function conjointly with said deviating optical device.

In one embodiment, the illuminating system comprises a protective outer lens comprising said deviating optical device. In other words, the deviating optical device may be integrated into the protective outer lens. As a variant, the deviating optical device may be integrated directly into the exit face of each of the illuminating optical modules. According to yet another variant, it may be integrated both into the protective outer lens and into the exit face of each illuminating optical module.

For example, the deviating optical device comprises striations for shaping the light beam emitted by the illuminating optical modules, these striations being produced in one or more zones each placed facing a group of at least one illuminating optical module.

The deviating optical device may also comprise prisms, when it is a question of modifying the pointing angle of the light beam emitted by the illuminating optical modules.

Thus, the striations and the prisms may have variable properties depending on their installation in the protective outer lens.

Advantageously, the illuminating optical modules comprise light-emitting diodes.

Another subject of the invention is, according to a second aspect, an exterior signaling and/or illuminating system for an aircraft, comprising an array of at least one light such as defined above.

DESCRIPTION OF THE DRAWINGS

Other aims, features and advantages of the invention will become apparent on reading the following description, given merely by way of nonlimiting example, and with reference to the appended drawings in which.

DETAILED DESCRIPTION

Figure 1:
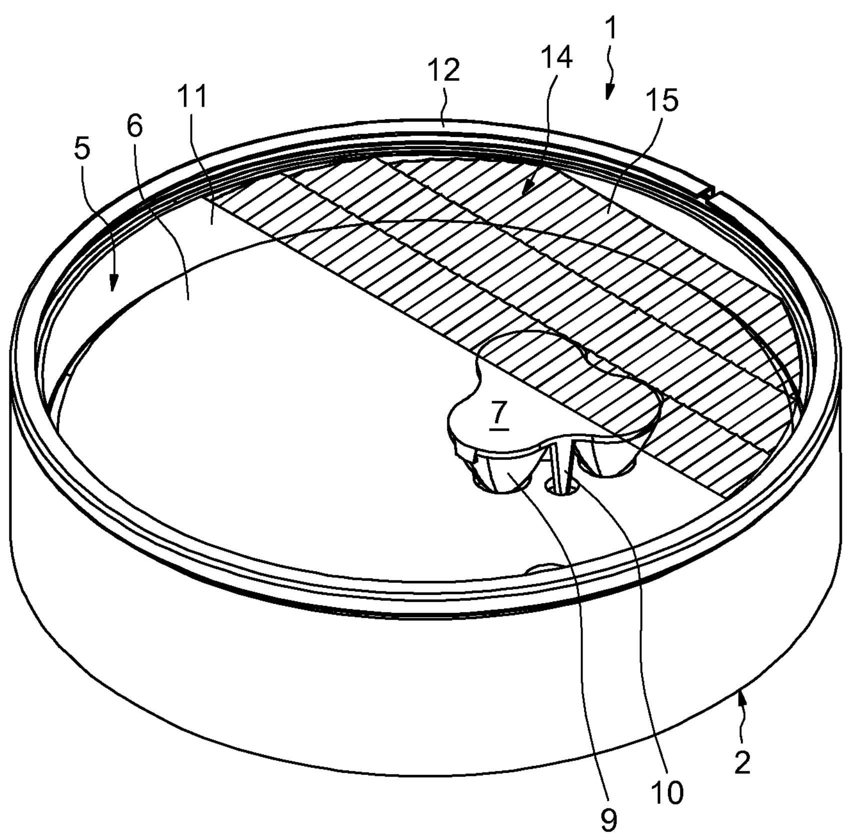
FIG. 1 is a perspective view of an exterior signaling and/or illuminating light according to the invention.
Figure 2:
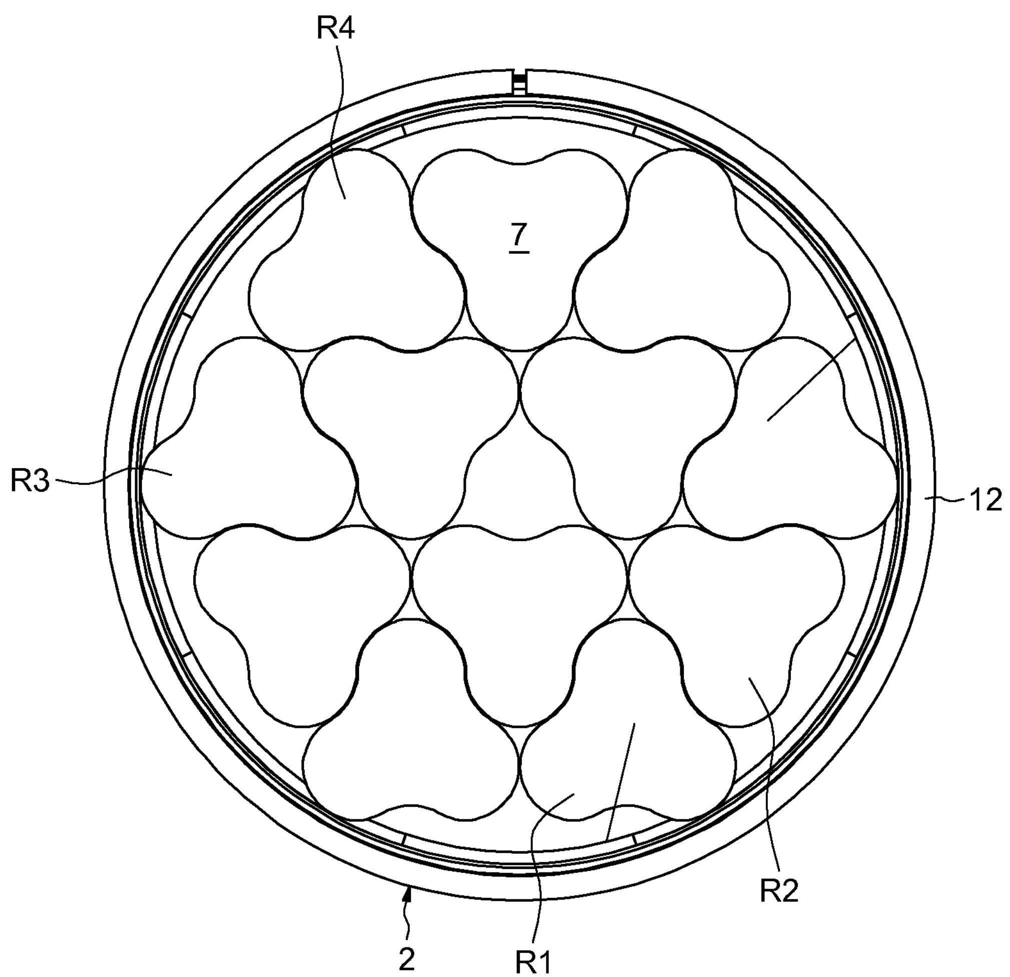
FIG. 2 is a top view of the light in FIG. 1, in which the protective outer lens has been removed.
Figure 3:
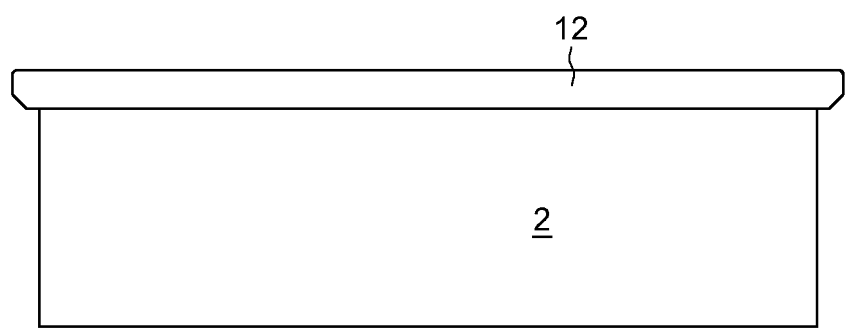
FIG. 3 is a side view of the light in the figure.

FIGS. 1 to 3 show an exterior signaling and/or illuminating light according to the invention, designated by the general reference 1.

In one particularly advantageous application of the invention, this light is intended to form an element of an exterior signaling and/or illuminating system fitted on board an aircraft and comprising one or more lights in order to provide one or more illuminating functions.

As may be seen in the figures, the exterior signaling and/or illuminating light essentially comprises a casing 2 intended to be fastened, for example, on-board an aircraft, especially on the root of the wings or on the landing-gear leg of the airplane.

The casing 2 may be made from any material suitable for the envisioned use, for example of metal. In the example shown in FIGS. 1 to 3, the casing 2 is cylindrical on the whole and has a round base. However, the scope of the invention would not be exceeded if the casing were any other shape.

Internally, the casing 2 delimits a housing 5 in which a plate 6 for mechanically fastening and electrically connecting illuminating optical modules 7 is mounted.

In FIG. 1, only one illuminating optical module has been shown, the others having been omitted.

However, it may be seen in FIG. 2 that a complete illuminating light comprises an array of illuminating optical modules 7 extending substantially over the entire area of the housing 5 so as to provide a uniform illumination that is of sufficient photometric power to meet the requirements of the exterior signaling and/or illuminating system.

The illuminating optical modules 7 comprise, in the example embodiment shown, a plurality of collimators 9 each associated with a light source. Preferably, light-emitting diodes (LEDs) will be used. Of course, other light sources, for example laser diodes, may be envisaged.

Although any type of illuminating optical module may be used in the context of the present description, in the embodiment in FIGS. 1 to 3, the illuminating optical modules each comprise three collimators and are produced in a single part by molding of polycarbonate or polymethyl methacrylate (PMMA) in a three-lobe shape facilitating the imbrication of the illuminating optical modules in the housing 5 and thus facilitating mixing of the illuminating optical modules if required. Fastening tabs, such as 10, are moulded with the array of collimators for their mounting on the plate 6.

The collimators 9 are, preferably, catadioptric collimators, and each ensure the collimation of the light flux emitted by one light source so as to deliver as output an array of light beams parallel to the optical axis of the illuminating optical module.

The signaling and/or illuminating light is completed by a protective outer lens 11 covering the array of optical modules and sealably fastened to a frame 12.

The outer lens 11 is equipped with a zone 14 that forms a deviating optical device capable of modifying the shape of the light beams emitted by some of the illuminating optical modules and, in particular, the spatial distribution of the light intensity emitted by the modules. It is a question, in particular, of modifying the pointing angle of the light beams.

The zone 14 is thus placed facing the optical modules 7 in question.

This zone here extends over about half the outer lens 11 so as to cover two rows R1 and R2 of illuminating optical modules (FIG. 2). It more particularly extends between a diameter of the outer lens and a parallel chord.

For example, the optical device 14 takes the form of striations 15 located facing a group of one or more illuminating optical modules 7. They are here intended to spread the light beam emitted by the lamps.

The striations may be uniform or have properties, for example a depth or a spacing, that vary depending on the zone of the outer lens in which they are formed.

Of course, other deviating optical devices may be provided depending on the illuminating function to be delivered. Thus, for example, the striations, the function of which is essentially to spread the light flux either horizontally, or vertically, depending on their orientation on the light, may be combined with one or more prisms or replaced by one or more prisms in order to locally modify the pointing angle of beams issued from the illuminating optical modules.

The scope of the invention is not exceeded if the deviating optical device is installed in other zones of the outer lens, for example a zone forming a ring extending around the periphery of the outer lens, or if the protective outer lens is equipped with a plurality of separate zones each equipped with an optical device that is identical or different in each zone.

As indicated above, the illuminating optical modules 7 are mounted on a plate 6 for mechanically fastening and electrically connecting the illuminating optical modules. They are controllable, for example in response to commands originating from the pilot, so as to be selectively activated depending on the phase of flight.

For example, when the deviating optical device takes the form of striations combined with a prism, enabling spreading of the light beam in combination with modification of the pointing angle of the beam, the illuminating optical modules 7 of rows R1 and R2 are turned on when the pilot wishes to widen the beam and direct it downwards, for example during a phase of taxiing of the aircraft on a taxiway, in order to leave or access a runway.

In contrast, during take-off, the beam must be narrower and horizontal. The modules of rows R3 and R4 (FIG. 2) are then turned on.

When the optical device is intended to modify the pointing angle of the light beams of the illuminating optical modules 7 of rows R1 and R2 in order to make it correspond to the angle of descent of the aircraft, the light may be used either as a landing light, when the illuminating optical modules 7 of rows R1 and R2 facing the optical device 14 are turned on so that the illuminating system points along the rectilinear slope of descent of the aircraft, or during take-off, when the illuminating optical modules 7 of rows R3 and R4 are turned on, in order to point substantially parallel to the ground.

The light described above thus allows a multifunctional signaling and/or illuminating system capable of providing at least one illuminating function to be produced, said system being particularly suitable for fitting on board aircraft.

The embodiments of the invention in which an exclusive property or privilege is claimed are defined as follows:

1. An exterior light, especially for an aircraft, comprising:

a casing delimiting a housing in which a plate is mounted;

a plurality of exterior illuminating optical modules disposed in a plurality of rows, wherein the plurality of exterior illuminating optical modules are configured to emit at least one exterior signaling and/or illuminating light; and at least one deviating optical device, wherein each exterior illuminating optical module is associated with a light source and mechanically fastened and electrically connected to the plate, the exterior light further comprises a protective outer lens covering the plurality of exterior illuminating optical modules and is disposed in a plane parallel to a plane containing the plurality of exterior illuminating optical modules, the protective outer lens comprises one or more zones forming the at least one deviating optical device disposed facing at least one row of the plurality of illuminating optical modules, the plurality of exterior illuminating optical modules are selectively activatable in order to selectively execute a signaling and/or illuminating function conjointly with the at least one deviating optical device, and the plurality of exterior illuminating optical modules includes a first plurality of exterior illuminating optical modules configured to emit light configured to pass through the at least one deviating optical device and a second plurality of exterior illuminating optical modules configured to emit light that does not pass through the at least one deviating optical device.

2. The exterior light according to claim 1, in which the at least one deviating optical device comprises striations configured to shape a light beam emitted by the first plurality of exterior illuminating optical modules, said striations being disposed in the one or more zones facing the first plurality of exterior illuminating optical modules.

3. The exterior light according to claim 2, wherein the one or more zones of the at least one deviating optical device extend between a diameter of the protective outer lens and a parallel chord.

4. The exterior light according to claim 2, wherein the one or more zones of the at least one deviating optical device define a ring extending around a periphery of the protective outer lens.

5. The exterior light according to claim 2, wherein the protective outer lens comprises a plurality of separate zones each comprising a deviating optical device identical or different in each zone.

6. The exterior light according to claim 1, in which the at least one deviating optical device comprises prisms.

7. The exterior light according to claim 1, in which the plurality of exterior illuminating optical modules comprises light-emitting diodes.

8. An exterior signaling and/or illuminating system for an aircraft comprising an array of exterior lights according to claim 1.

9. The exterior light according to claim 1, wherein each of the plurality of collimators is configured to collimate a light flux emitted by the light source and emit an array of light beams parallel to an optical axis of the associated exterior illuminating optical module.

10. The exterior light according to claim 1, wherein the at least one deviating optical device is integrated both into the protective outer lens and into an exit face of each of the exterior illuminating optical modules.

* * * * *